US012572939B2

(12) United States Patent
Gupta

(10) Patent No.: US 12,572,939 B2
(45) Date of Patent: Mar. 10, 2026

(54) MULTI NODAL AUTHENTICATION TECHNOLOGY

(71) Applicant: Bank of America Corporation, Charlotte, NC (US)

(72) Inventor: Saurabh Gupta, New Delhi (IN)

(73) Assignee: Bank of America Corporation, Charlotte, NC (US)

( * ) Notice: Subject to any disclaimer, the term of this patent is extended or adjusted under 35 U.S.C. 154(b) by 535 days.

(21) Appl. No.: 17/452,607

(22) Filed: Oct. 28, 2021

(65) Prior Publication Data

US 2023/0137135 A1 May 4, 2023

(51) Int. Cl.
*G06Q 20/40* (2012.01)
*G06K 19/07* (2006.01)
(Continued)

(52) U.S. Cl.
CPC ... *G06Q 20/40145* (2013.01); *G06K 19/0702* (2013.01); *G06K 19/0728* (2013.01); *G06K 19/07707* (2013.01); *G06Q 20/341* (2013.01); *G06Q 20/352* (2013.01); *G06Q 20/3825* (2013.01); *G06Q 20/4018* (2013.01); *G06Q 20/409* (2013.01); *G06V 30/36* (2022.01); *G06V 40/166* (2022.01); *G06V 40/168* (2022.01); *G06V 40/172* (2022.01); *H04L 63/0853* (2013.01); *G06Q 20/1085* (2013.01); *G06Q 20/204* (2013.01); *G06Q 40/02* (2013.01)

(58) Field of Classification Search
CPC .......... G06Q 20/40145; G06V 40/168; G06V 30/36; G06V 40/172

USPC .......................................................... 705/17
See application file for complete search history.

(56) References Cited

U.S. PATENT DOCUMENTS 10,055,740 B2 * 8/2018 Hanson .................. G06Q 30/00
2006/0000897 A1 * 1/2006 Bonalle ................ G06Q 20/341
235/382

(Continued)

FOREIGN PATENT DOCUMENTS

CN 103368743 A * 10/2013
CN 105469252 A * 4/2016
KR 102177478 * 11/2020 ........... G06Q 20/401

*Primary Examiner* — Luna Champagne
(74) *Attorney, Agent, or Firm* — Weiss & Arons LLP

(57) ABSTRACT

Methods are provided for authenticating an initiator of a transaction during processing of the transaction. Methods may include initiating a transaction, including transaction details, at a transaction initiation node. Methods may include transmitting the transaction to a processing entity. Methods may include identifying that the transaction is above a threshold of anomalous transactions based on historic transactions associated with the transaction details. Methods may include transmitting an authorization request from the processing entity to a payment card linked to the transaction details. Methods may include receiving the authorization request at the payment card. Methods may include approving and/or denying the authorization request at the payment card. Approving and/or denying the request may include input of a signature and/or biometric. Methods may include transmitting the approval and/or denial from the payment card to the processing entity. The processing entity may transmit the approval and/or denial to the transaction initiation node.

7 Claims, 4 Drawing Sheets

(51) Int. Cl.

| | | |
|---|---|---|
| *G06K 19/077* | (2006.01) |
| *G06Q 20/10* | (2012.01) |
| *G06Q 20/20* | (2012.01) |
| *G06Q 20/34* | (2012.01) |
| *G06Q 20/38* | (2012.01) |
| *G06Q 40/02* | (2023.01) |
| *G06V 30/32* | (2022.01) |
| *G06V 40/16* | (2022.01) |
| *H04L 9/40* | (2022.01) |

(56) References Cited

U.S. PATENT DOCUMENTS

2019/0286805 A1* 9/2019 Law ........................ G06F 21/34
2022/0230168 A1* 7/2022 Barakat ............. G06Q 20/3226

* cited by examiner

MULTI NODAL AUTHENTICATION TECHNOLOGY

FIELD OF TECHNOLOGY

Aspects of the disclosure relate to transactions authentication.

BACKGROUND OF THE DISCLOSURE

Payments may be made using a variety of channels. Such channels may include online channels, virtual payment channels, paper check channels, automated teller machine ("ATM") channels and any other suitable channels. Payments processed on all of these payment channels may be susceptible to fraud. During the processing of a payment, the processing entity may suspect the payment as being fraudulent. Conventionally, the suspected fraudulent payment may be terminated. However, at times, when the payment was made in good faith, terminating the transaction may cause difficulty to the payment initiator.

Additionally, in the event that a fraudulent charge was processed, the charge may need to be reversed after the payment has been completed. Typically, it is difficult to reverse a charge once a payment has been completed. Many times, goods that have been fraudulently received are not retrievable. As such, the financial institution, which issued a payment instrument used to obtain the fraudulently-received goods, typically is responsible for payment for the goods.

Therefore, it would be desirable to provide authentication technology that authenticates the identity of the individual executing the transaction prior to completion of the transaction.

SUMMARY OF THE DISCLOSURE

Apparatus and methods for authenticating an initiator of a transaction prior to completing processing of the transaction is provided.

Methods may include initiating the transaction at a transaction initiation node. The transaction initiation node may be located at a payment channel. Examples of a payment channel may include an online channel, an ATM channel and a point-of-sale ("POS") terminal channel. The transaction may include a plurality of transaction details.

The plurality of transaction details may include details relating to the channel. Such details may include the geographical location of the channel, an identifier associated with the channel and any other suitable details relating to the channel. Examples of a geographical location may include a set of physical geographical coordinates for a POS device or an ATM, and an internet protocol ("IP") address for an online channel. Examples of an identifier associated with the channel may include a unique identifier associated with the POS device, the ATM or the online transaction interface.

The plurality of transaction details may also include a payment type associated with the transaction. The payment type may include a card, a check, an automated clearing house ("ACH") or any other suitable payment type. The plurality of transaction details may include data specific to the payment type. For example, details relating to a card-based payment may include payment instrument details, such as a card number, a card name, a card expiration date and a card security code. Details relating to a check-based payment may include check details such as an account number, a routing number, a check number and a check date. Details relating to an ACH-based payment may include payee details including payee name, payee account type, payee routing number, payee financial institution name, payee account number and whether the payee account is a personal account or a business account. Details relating to an ACH-based payment may also include a payer account number, a delivery method, a deliver-by-date and a memorandum.

The plurality of transaction details may include the transaction amount and the transaction date.

Methods may include transferring the transaction via the payment channel to a processing entity. The processing entity may be a financial institution. The processing entity may be associated with a beneficiary of the transaction. The processing entity may be associated with a benefactor of the transaction.

Methods may include identifying, at the processing entity, that the transaction is over a threshold level of suspected compromise. The transaction may be identified as exceeding a threshold level of suspected compromise based on suspicious transaction details. Suspicious transaction details may be identified based on a comparison between the transaction details and previous historical usage of an account identified by the transaction details. For example, a set of transaction details may identify account no. 1234567890. The processing entity may compare the transaction details to historical transactions that were previously executed in account no. 1234567890.

The comparison may include comparing the transaction amount, included in the transaction details, to an average transaction amount of historical transactions. The comparison may also include comparing the transaction amount, included in the transaction details, to the highest transaction amount of historical transactions. The comparison may also include comparing the geographical location, included in the transaction details, to the most recent geographical location included in the historical transactions. As such, the comparison may identify an anomaly with the transaction in process. Such an anomaly may include whether the transaction is significantly above or below an average transaction amount, whether the transaction is executed outside a geographical location perimeter in which transactions are typically executed or any other suitable anomaly.

Methods may include identifying, at the processing entity, one or more payment cards linked to the transaction details.

In some embodiments, the processing entity may involve two or more entities. The processing entity may involve two or more entities when a beneficiary, or merchant, associated with the transaction, may be associated with a different financial institution than the benefactor associated with the transaction. In such embodiments, the two entities may communicate information between each other, and may be referred to herein, as the processing entity.

Methods may include transmitting an authorization request from the processing entity to the one or more payment cards. The authorization request may include at least one of the transaction details. For example, the authorization request may include channel data and transaction amount data.

The one or more payment cards may have the following dimensions: a length that is not greater than 85.60 mm, a width that is not greater than 53.98 mm and a thickness that is not greater than 0.8 mm.

Methods may include receiving the authorization request at the one or more payment cards. The authorization request may be received at the one or more payment cards via a wireless controller executing on a nano wireless network interface card ("NIC") included in each of the one or more payment cards.

Methods may also include displaying the authorization request on the one or more payment cards. The authorization request may be displayed on a nano light emitting diode ("LED") touch screen embedded in the one or more payment cards.

Methods may also include receiving instructions regarding the authorization request at the one or more payment cards. The receipt of instructions may include capturing a user's biometric information at a camera included in the one or more payment cards. The biometric information may include facial features of the user. The receipt of instructions may also include capturing a signature on the nano LED touch screen.

Methods may include transmitting the instructions from the one or more payment cards to the processing entity. The transmitting may be via the wireless controller executing on the nano wireless NIC included in each of the one or more payment cards. As such, the captured user's biometric information and/or signature may be transferred from the wireless controller, executing on the nano wireless NIC included in each payment card, to the processing entity.

Methods may include authorizing the transaction at the processing entity when the instructions indicate authorizing the transaction. Methods may include denying the transaction at the processing entity when the instructions indicate denying the transaction.

Methods may include transmitting the approval from the processing entity to the transaction initiation node. In some embodiments, methods may also include transmitting the instructions comprising the approval and/or denial from the payment card directly to the transaction initiation node.

At times, the one or more payment instruments may receive multiple authorization requests within a predetermined time frame. The predetermined time frame may be five minutes, ten minutes, twenty-four hours or any other suitable time frame. The one or more payment instruments may also receive multiple authorization requests regarding an identical transaction. The one or more payment instruments may also receive multiple authorization requests regarding multiple transactions that are similar above a threshold of similarity. Such a threshold of similarity may consider transaction amount, merchant identifier, date or date range and other suitable variables. For example, two transactions may be considered similar if the two transactions share two out of the three aforementioned variables.

The number of multiple authorization requests may be above a predetermined number of authorization requests. The predetermined number may be three, five or any other suitable number. As such, upon receiving over a predetermined number of authorization requests, either within a predetermined time frame or regarding identical or similar transactions, the instructions may indicate denying the transaction.

Additionally, the processing entity may deny the transaction if instructions have not been received at the processing entity after a predetermined amount of time has lapsed after transmission of the authorization request from the processing entity to the payment instrument.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
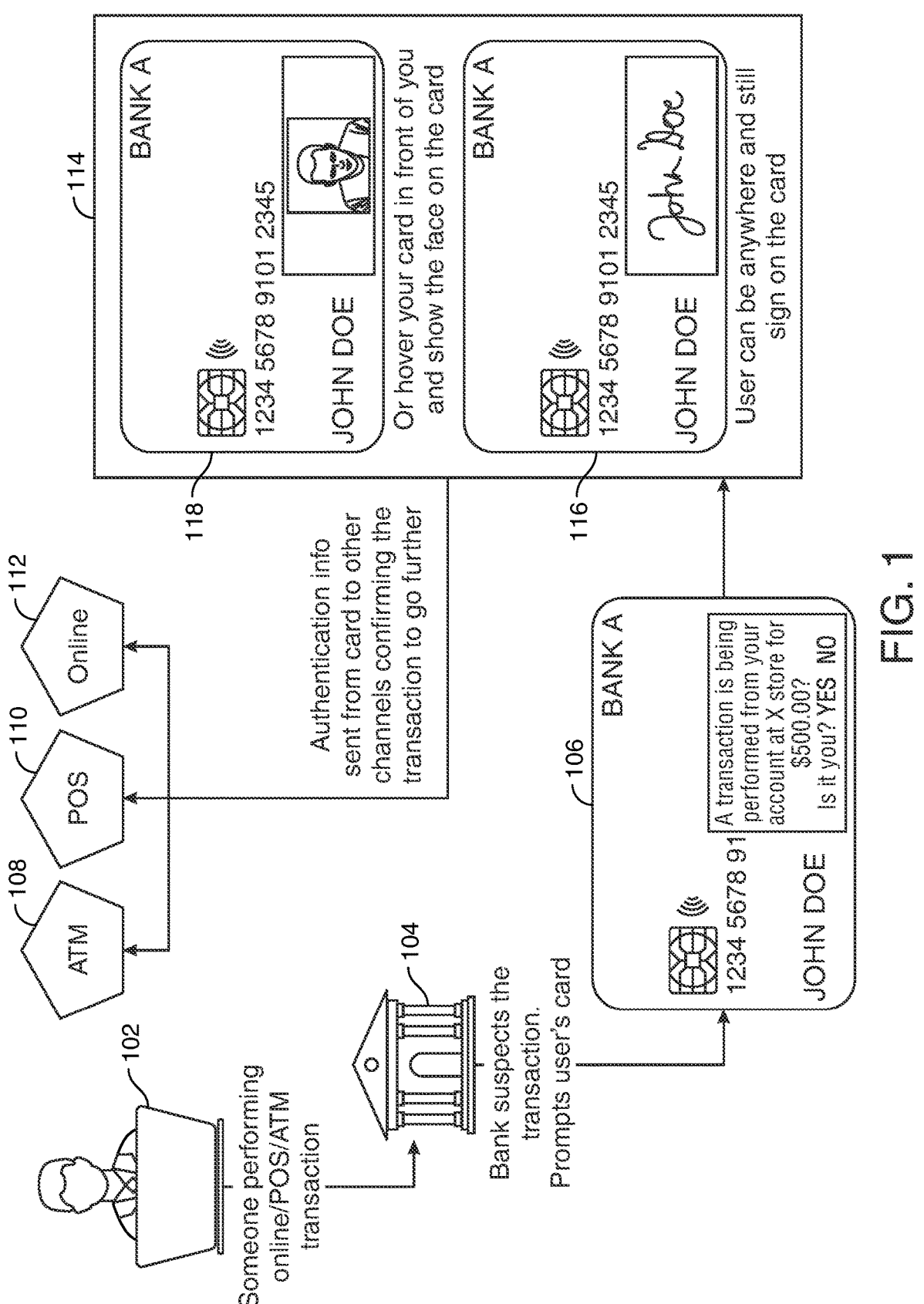
FIG. 1 shows an illustrative diagram in accordance with principles of the disclosure.

Apparatus and methods for authenticating an initiator of a transaction prior to completing processing of the transaction is provided. A payment instrument may be utilized to authenticate the transaction in process. Such a payment instrument may be provided.

The payment instrument may include a housing. The housing may have a length that is not greater than 85.60 mm, a width that is not greater than 53.98 mm and a thickness that is not greater than 0.8 mm.

The payment instrument may include a microprocessor. The microprocessor may provide computing capabilities to the payment instrument.

The payment instrument may include a battery. The battery may provide wireless energy to the payment instrument. The battery may be a rechargeable battery.

The payment instrument may include a camera. The camera may be configured to capture photographs.

The payment instrument may include a nano LED touch screen. The touch screen may display data and/or receive input. The touch screen may display a keypad/number pad for receipt of user input.

The payment instrument may include a nano wireless NIC. The nano wireless NIC may provide wireless communication to the payment instrument.

The payment instrument may include a wireless controller module. The wireless controller module may interface between the nano wireless NIC and a network-enabled device. The network-enabled device may be a WI-FI enabled device.

The payment instrument may include a confirmation module. The confirmation module may be executable by the microprocessor. The confirmation module may initiate a confirmation of an identity of a transaction initiator.

The payment instrument may include a signature and/or biometric capture match module. The signature and/or biometric capture match module may be executable by the microprocessor. The signature and/or biometric capture match module may capture a signature and/or a biometric capture of a payment instrument user.

The payment instrument may include a verification module. The verification module may be executable by the microprocessor. The verification module may verify that the identity of the transaction initiator matches an identity of the payment instrument user.

The microprocessor may receive a transaction authorization request from a processing entity. The transaction authorization request may request authorization of a transaction. The transaction authorization request may include a transaction amount and a merchant identifier. The transaction may have been initiated at a payment channel. The transaction may include a plurality of transaction components, also referred to as transaction details. The transaction components may include a card number, a card expiration date, a card verification value ("CVV"), a transaction amount and any other suitable transaction components.

The confirmation module may initiate a confirmation for the transaction. The nano LED touch screen may display one or more transaction components and/or a selectable verification button.

Upon selection of the selectable verification button, the signature and/or biometric capture match module may be initiated. The signature and/or biometric capture module may capture the signature and/or biometric capture of the payment instrument user.

Upon capture of the signature and/or biometric capture of the payment instrument user, the verification module may verify that the identity of the transaction initiator matches an identity of the payment instrument user. The verification module may communicate with the processing entity to verify the payment instrument user.

In some embodiments, the verification module may communicate the captured signature and/or biometric capture to a processing entity for verification.

In some embodiments, the nano LED touch screen may also display a selectable verification-denial button. Upon selection of the selectable verification-denial button, the signature and/or biometric capture may be captured, the verification module may be initiated, and the verification-denial may be transmitted from the verification module to the processing entity. At times, upon selection of the selectable verification-denial button, the signature and/or biometric capture module may be bypassed, the verification module may be initiated, and the verification-denial may be transmitted from the verification module to the processing entity. Upon receipt of a verification-denial, the processing entity may deny the transaction. The transaction denial may be transmitted to the transaction initiation node at the appropriate payment channel.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

The steps of methods may be performed in an order other than the order shown or described herein. Embodiments may omit steps shown or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

FIG. 1 shows an illustrative diagram. A user may initiate a transaction as shown at 102. The transaction may be initiated at a transaction initiation node. The transaction initiation node may be an online transaction interface associated with an online channel, a POS device associated with a POS channel, an ATM associated with an ATM channel or any other suitable transaction initiation node. The transaction may involve a plurality of transaction details. The plurality of transaction details or a portion of the plurality of transaction details may be captured at the transaction initiation node.

The plurality of transaction details may include details relating to the channel. Such details may include the geographical location of the channel, an identifier associated with the channel and any other suitable details relating to the channel. Examples of a geographical location may include a set of physical geographical coordinates for a POS device or an ATM, and an IP address for an online channel. Examples of an identifier associated with the channel may include a unique identifier associated with the POS device, the ATM or the online transaction interface.

The plurality of transaction details may also include a payment type associated with the transaction. The payment type may include a card, a check, an ACH or any other suitable payment type. The plurality of transaction details may include data specific to the payment type. For example, details relating to a card-based payment may include payment instrument details, such as a card number, a card name, a card expiration date and a card security code. Details relating to a check-based payment may include check details such as an account number, a routing number, a check number and a check date. Details relating to an ACH-based payment may include payee details including payee name, payee account type, payee routing number, payee financial institution name, payee account number and whether the payee account is a personal account or a business account. Details relating to an ACH-based payment may also include a payer account number, a delivery method, a deliver-by-date and a memorandum.

The plurality of transaction details may include the transaction amount and the transaction date.

The transaction, including the transaction details, may be forwarded to a processing entity. The processing entity may be a financial institution, a bank or any other suitable processing entity.

The processing entity may suspect the transaction, as shown at 104. As such, the transaction may be identified at the processing entity to be over a threshold level of suspected compromise. The transaction may be identified as exceeding a threshold level of suspected compromise based on suspicious transaction details. Suspicious transaction details may be identified based on a comparison between the transaction details and previous historical usage of an account identified by the transaction details. For example, a set of transaction details may identify account no. 1234567890. The processing entity may compare the transaction details to historical transactions that were previously executed in account no. 1234567890.

The comparison may include comparing the transaction amount, included in the transaction details, to an average transaction amount of historical transactions. The comparison may also include comparing the transaction amount, included in the transaction details, to the highest transaction amount of historical transactions. The comparison may also include comparing the geographical location, included in the transaction details, to the most recent geographical location included in the historical transactions.

The comparison may also include identifying a proximity of the payment instrument to the transaction initiation node. A distance between the payment instrument and the transaction initiation node above a predetermined threshold may be identified as an anomaly.

As such, the comparison may identify an anomaly with the transaction in process. Such an anomaly may include whether the transaction is significantly above or below an average transaction amount, whether the transaction is executed outside a geographical location perimeter in which transactions are typically executed, whether the payment instrument is not within a predetermined proximity to the transaction initiation node or any other suitable anomaly.

Upon identification of suspicious transaction details, or a transaction that exceeds the threshold of suspected compromise, the processing entity may transmit a message to one or more physical payment instruments, as shown at 106. The one or more physical payment instruments may be associated with the primary account holder. Such a payment instrument may include a debit or credit card, a mobile wallet resident on a mobile device or any other suitable payment instrument.

The one or more physical payment instruments may include a screen. The screen may display the received message. The screen shown at 106 may display A transaction is being performed from your account X store for $500.00. Is it you? Yes No. The bearer of the physical payment instrument may respond by selecting the yes button.

The bearer of the physical payment instrument may also input security details onto the physical payment instrument, as shown at 114. Such security details may include a biometric capture, as shown at 118. A biometric capture may involve capturing a photo of the facial features of the bearer. The photo capture may be executed at the physical payment instrument. The photo capture may be executed by a camera that is embedded in the card. The camera may be installed so that the lens is directed out of the front face or rear face of the card.

Such security details may include input of a signature onto an input area of the payment instrument, as shown at 116. The bearer of the physical payment instrument may also input a signature onto the physical payment instrument, as shown at 114.

In some embodiments, the security details, such as the photo capture or the signature, may be transmitted to the processing entity. The processing entity may process the received security details. The process may include comparing the received security details to previously stored security details. Based on the comparison, the security details may be verified at the processing entity. The verification may be transmitted to the transaction initiation node. The transaction initiation node may be associated with an ATM channel 108, a POS channel 110 or an online channel 112.

In other embodiments, the security details may be authenticated at the payment instrument. As such, the payment instrument may transmit the verification to the transaction initiation node.

Once the transaction initiation node receives the verification, the transaction initiation node may complete the transaction.

Figure 2:
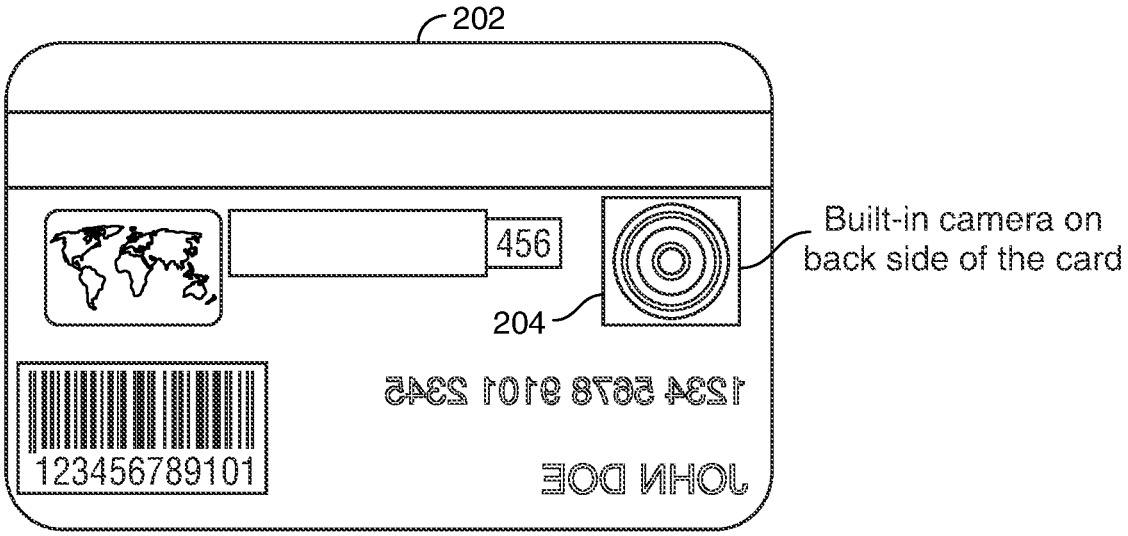
FIG. 2 shows another illustrative diagram in accordance with principles of the disclosure.

FIG. 2 shows another illustrative diagram. The illustrative diagram shows the back side of payment instrument 202. Camera 204 may be built into the back side of payment instrument 202. There may be one or more actuators that actuate camera 204.

Camera 204 may capture biometric data, such as facial features. Camera 204 may capture a copy of a handwritten signature. Camera 204 may capture any other suitable data.

Figure 3:
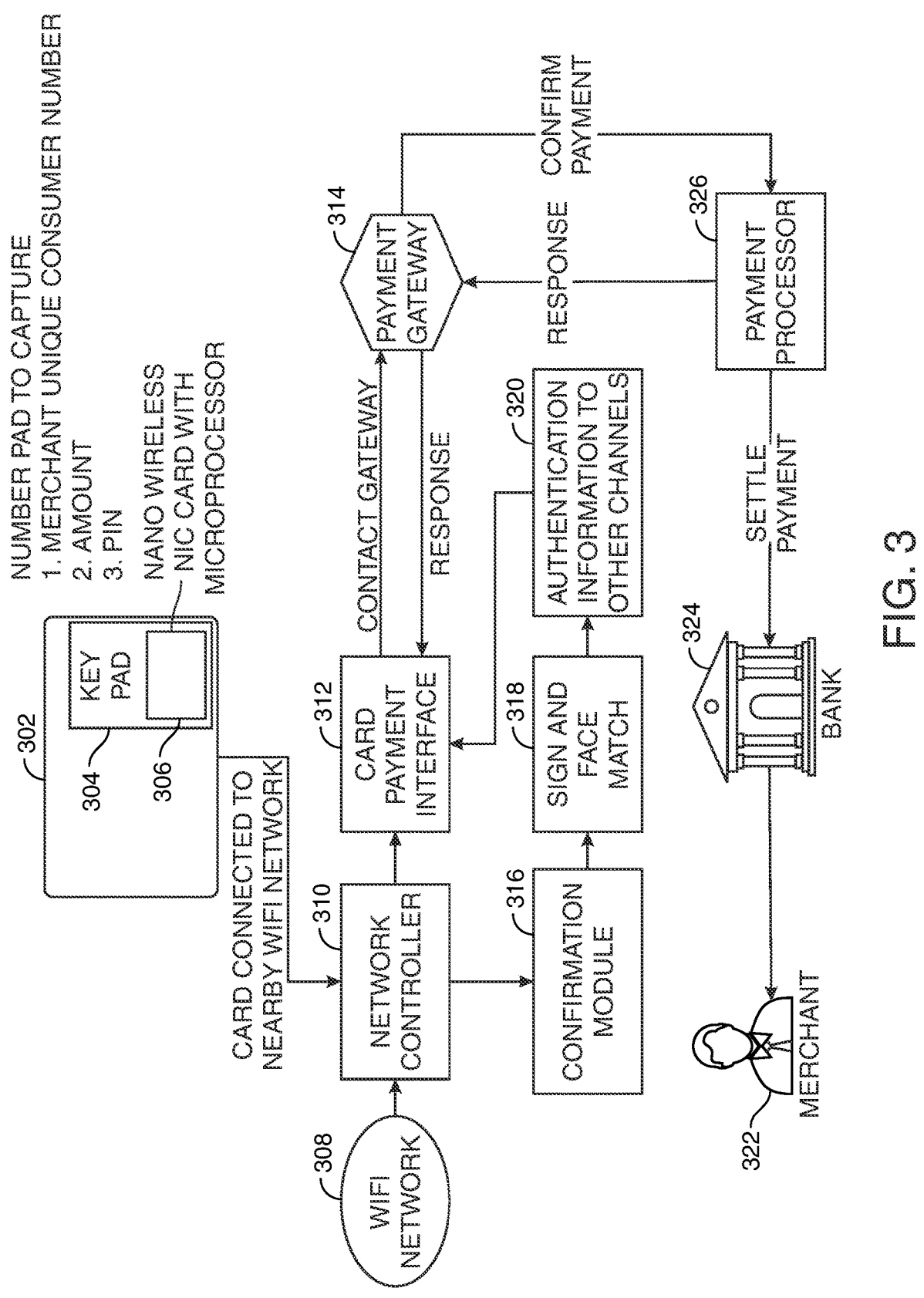
FIG. 3 shows yet another illustrative diagram in accordance with principles of the disclosure.

FIG. 3 shows yet another illustrative diagram. A transaction may be initiated at a transaction initiation node. The transaction initiation node may involve a user/customer and a merchant. The transaction may or may not physically involve payment instrument 302. An example of a transaction that may not physically involve payment instrument 302 may be an online transaction. An example of a transaction that may physically involve payment instrument 302 may be a POS transaction.

It should be appreciated that payment instrument 302 may include various components. A subset of these components may be utilized when payment instrument 302 is physically involved in the initiation of the transaction. In the event that payment instrument 302 is not physically involved at the initiation of the transaction, a subset of the following components may not be deployed.

The components may include keypad 304. Keypad/number pad 304 may be a dynamic keypad and/or a static keypad. As such, the buttons on keypad 304 may either be permanent and/or vary according to a current display of keypad/number pad 304.

Keypad/number pad 304 may capture a unique customer number associated with the merchant. It should be noted that the merchant may be a customer of a financial institution. As such, the merchant may have been assigned a unique customer number vis-à-vis the financial institution.

Keypad/number pad 304 may also capture an amount of the transaction. Keypad/number pad may also capture a personal identification number ("PIN") associated with the user.

Payment instrument 302 may also include nano wireless network interface card ("NIC") 306. NIC 306 may be embedded in payment instrument 302. NIC 306 may be connected to a microprocessor. The microprocessor may also be embedded in payment instrument 302. NIC 306 may provide wireless communication, such as WI-FI connectivity, between payment instrument 302 and network controller 310. NIC 306 may communicate with the network controller via WI-FI connectivity, as shown at 308.

Network controller 310 may communicate with card payment interface 312 and confirmation module 316. Card payment interface 312 may contact payment gateway 314 to process payment. Payment gateway 314 may communicate with payment processor 326 to complete payment. Payment processor 326 may attempt to settle payment with bank 324.

Prior to completing the payment, bank 324 may evaluate the payment for a suspicious activity rating. In the event that the transaction is below a threshold level of suspected compromise, bank 324 may process the transaction. Processing the transaction may include approving the transaction and remitting the funds to merchant 322. Processing the transaction may also include denying the transaction and notifying merchant 322 and a user of the transaction denial.

In the event that the transaction is above a threshold level of suspected compromise, bank 324 may initiate confirmation module 316. Confirmation module 316 may attempt to confirm the identity of a user at the transaction initiation. In order to confirm the identity of the user at the transaction initiation node, sign and face match module 318 may be initiated.

Sign and face match module 318 may request a signature and/or a biometric capture, such as facial capture, at payment instrument 302. Sign and face match module 318 may verify the user based on the signature and/or biometric capture. In some embodiments, the verification may involve entry of transaction elements at payment instrument 302. In such embodiments, sign and face match module 318 may also capture the merchant's unique customer number, the amount and/or the PIN at payment instrument 302.

Upon verification of the user via sign and face match module 318, authentication information to other channels module 320 may be initiated. Authentication information to other channels module 320 may receive the verification data from sign and face match module 319. Authentication information to other channels 320 may transmit the verification data to any other channels 320 that may be waiting for verification.

Authentication information to other channels 320 may be utilized when the transaction is initiated on a channel that does not physically involve payment instrument 302. Such a transaction may be an online transaction that involves manual entry of payment instrument information. Payment instrument information may include a card number, a card expiration date and a CVV.

Authentication information to other channels module 320 may also communicate with card payment interface 312. Card payment interface 312 may contact payment gateway 314 with the verification data. Payment gateway 314 may transmit the verification to payment processor 326. Payment processor 326 may settle the payment with bank 324. Bank 324 may remit funds to merchant 322.

Figure 4:
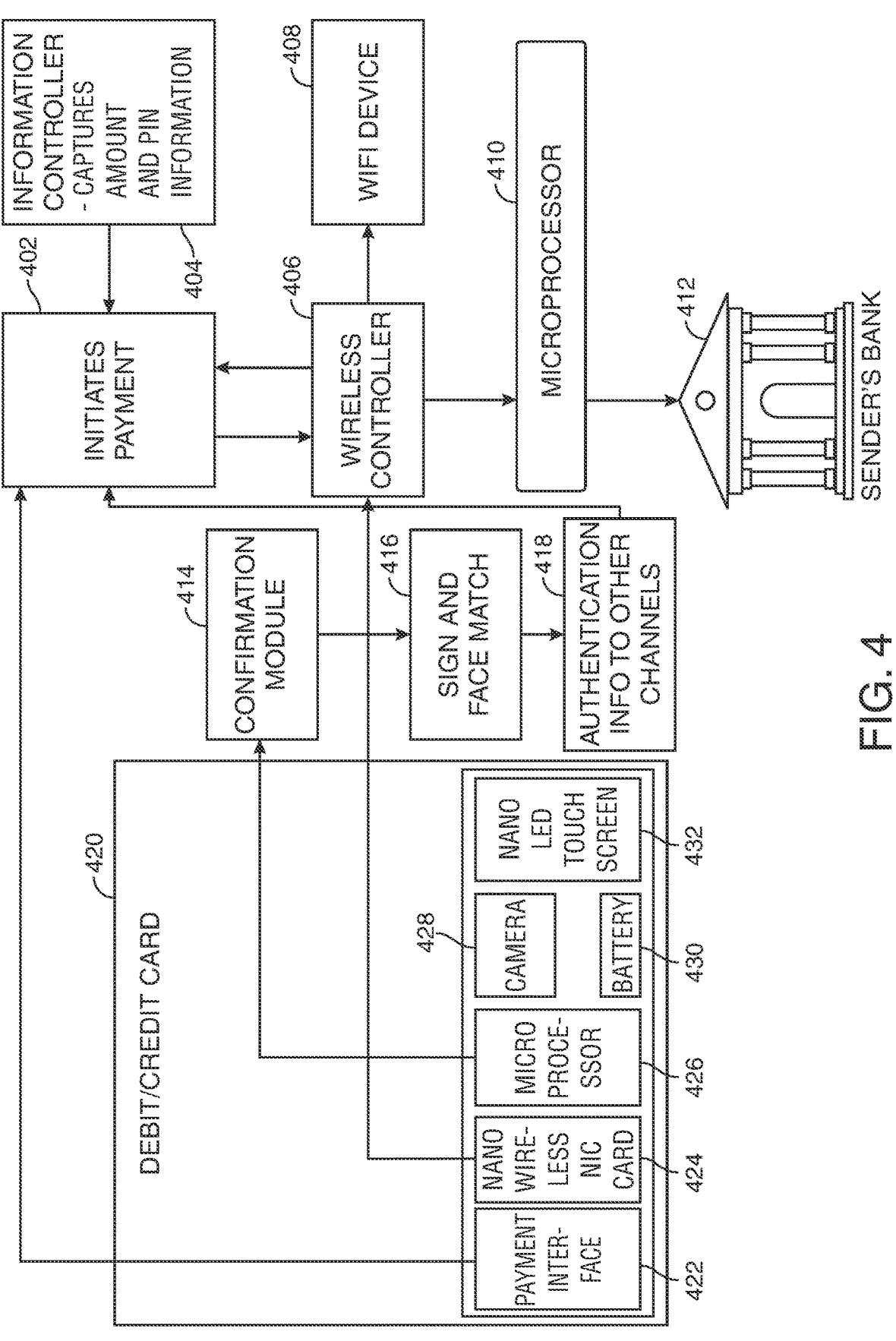
FIG. 4 shows still another illustrative diagram in accordance with principles of the disclosure.

FIG. 4 shows an illustrative diagram. Debit/credit card 420 may include payment interface, shown at 422. Payment interface, shown at 422, may initiate the payment, as shown at payment initiator 402.

Information controller 404 may be a software module operable to capture information. Such information may include a transaction amount associated with the transaction. Such information may also include a PIN associated with debit/credit card 420. Information captured by information controller 404 may be input into payment initiator 402.

Debit/credit card 420 may also include nano wireless NIC card, shown at 424. Nano wireless NIC card 424 may be a wireless communication element. The wireless communication element may provide wireless communication between the debit/credit card 420 and a WIFI device, shown at 408. Wireless controller 406 may provide the software layer that enables the connection between nano wireless NIC card 424 and WIFI device 408. Wireless controller 406 may also communicate with payment initiator 402 in order to initiate a payment.

Debit/credit card 420 may include a battery, shown at 430. Battery 430 may provide power to the various components of debit/credit card 420.

Debit/credit card 420 may also include a microprocessor, shown at 426 and 410. Microprocessor 426 may provide the processing capabilities for the debit/credit card 420. Microprocessor 426 may also execute confirmation module 414, sign and face match module 416 and authentication information to other channels module 418. Confirmation module 414 may confirm the identify of an initiator of a transaction.

In order to confirm the identity of an initiator of a transaction, confirmation module 414 may initiate sign and face match module 416.

Sign and face match module 318 may request a signature and/or a biometric capture, such as facial capture, at debit/credit card 420. The biometric capture may be captured at camera 428. Camera 428 may be embedded in debit/credit card 420. The signature may be received on, and captured using, a nano LED touch screen, shown at 432. Nano LED touch screen 432 may also be embedded in debit/credit card 420.

Upon verification of the user via sign and face match module 416, authentication information to other channels module 418 may be initiated. Authentication information to other channels module 418 may receive the verification data from sign and face match module 416. Authentication information to other channels 418 may transmit the verification data to any other channels 418 that may be waiting for verification.

Upon verification of the user, microprocessor 410 may instruct sender's bank 412 to complete the transaction.

Thus, a multi nodal authentication technology is provided. Persons skilled in the art will appreciate that the present invention can be practiced by other than the described embodiments, which are presented for purposes of illustration rather than of limitation. The present invention is limited only by the claims that follow.

What is claimed is:

1. A payment instrument comprising:
a housing having:
a length that is not greater than 85.60 mm;
a width that is not greater than 53.98 mm; and
a thickness that is not greater than 0.8 mm;
a microprocessor that provides computing capabilities to the payment instrument;
a battery that provides wireless energy to the payment instrument;
a camera configured to capture photographs;
a nano light emitting diode ("LED") touch screen configured to:
display data; and
receive input;
a nano wireless network interface card ("NIC") that provides wireless communication to the payment instrument;
a wireless controller module that interfaces between the nano wireless NIC and a network-enabled device;
a confirmation module executable by the microprocessor, said confirmation module that initiates a confirmation of an identity of a transaction initiator;
a signature capture match module executable by the microprocessor, said signature capture match module that captures, on the nano LED touch screen, a signature capture of a payment instrument user; and
a verification module executable by the microprocessor, said verification module that verifies that the identity of the transaction initiator matches an identity of the payment instrument user; wherein:
the microprocessor receives a transaction authorization request from a processing entity, the transaction authorization request for authorization of a check-based transaction that was initiated at a payment channel, said check-based transaction comprising a plurality of transaction components, said transaction components comprising an account number, a routing number, a check number and a check date;
the confirmation module initiates the confirmation for the transaction;
the nano LED touch screen displays:
one or more transaction components;
a selectable verification button; and
a selectable verification-denial button;
upon selection of the selectable verification-denial button:
the signature capture module is bypassed;
the verification module is initiated; and
the verification module transmits a verification-denial to the processing entity;
upon selection of the selectable verification button;
the signature capture match module is initiated;
the signature capture module captures, at the nano LED touch screen, the signature capture of the payment instrument user; and
upon capture, at the nano LED touch screen, of the signature capture of the payment instrument user, the verification module verifies that the identity of the transaction initiator matches an identity of the payment instrument user.

2. The payment instrument of claim 1, wherein the transaction authorization request comprises a transaction amount and a merchant identifier.

3. The payment instrument of claim 1, wherein the transaction components comprise a card number, a card expiration date, a card verification value ("CVV") and a transaction amount.

4. The payment instrument of claim 1, wherein the network-enabled device is a WI-FI enabled device.

5. The payment instrument of claim 1, wherein the verification module communicates with the processing entity to verify the payment instrument user.

6. A payment instrument comprising:

a housing having:

a length that is not greater than 85.60 mm;

a width that is not greater than 53.98 mm; and a thickness that is not greater than 0.8 mm;

a microprocessor that provides computing capabilities to the payment instrument;

a battery that provides wireless energy to the payment instrument;

a camera configured to capture photographs;

a nano light emitting diode ("LED") touch screen configured to:

display data; and receive input;

a nano wireless network interface card ("NIC") that provides wireless communication to the payment instrument;

a wireless controller module that interfaces between the nano wireless NIC and a network-enabled device;

a confirmation module executable by the microprocessor, said confirmation module that initiates a confirmation of an identity of a transaction initiator;

a signature capture match module executable by the microprocessor, said signature capture match module that captures, on the nano LED touch screen, a signature capture of a payment instrument user; and a verification module executable by the microprocessor, said verification module that communicates the captured signature capture to a processing entity for verification; wherein:

the microprocessor receives a transaction authorization request from the processing entity, the transaction authorization request for authorization of an automated clearing house ("ACH")-based transaction that was initiated at a payment channel, said transaction comprising a plurality of transaction components, said plurality of transaction components comprising a payee name, a payee account type, a payee routing number, a payee financial institution name, a payee account number, a payer account number, a delivery method and a deliver-by-date;

the confirmation module initiates the confirmation for the transaction;

the nano LED touch screen displays:

one or more transaction components;

a selectable verification button; and a selectable verification-denial button;

upon selection of the selectable verification-denial button;

the signature capture module is bypassed;

the verification module is initiated;

the verification module transmits a verification-denial to the processing entity;

upon selection of the selectable verification button:

the signature capture match module is initiated;

the signature capture captures, at the nano LED touch screen, the signature capture of the payment instrument user; and upon capture, at the nano LED touch screen, of the signature capture of the payment instrument user, the verification module transmits the captured signature capture to the processing entity.

7. The payment instrument of claim 6, wherein the transaction authorization request comprises a transaction amount and a merchant identifier.

* * * * *